UNITED STATES PATENT OFFICE.

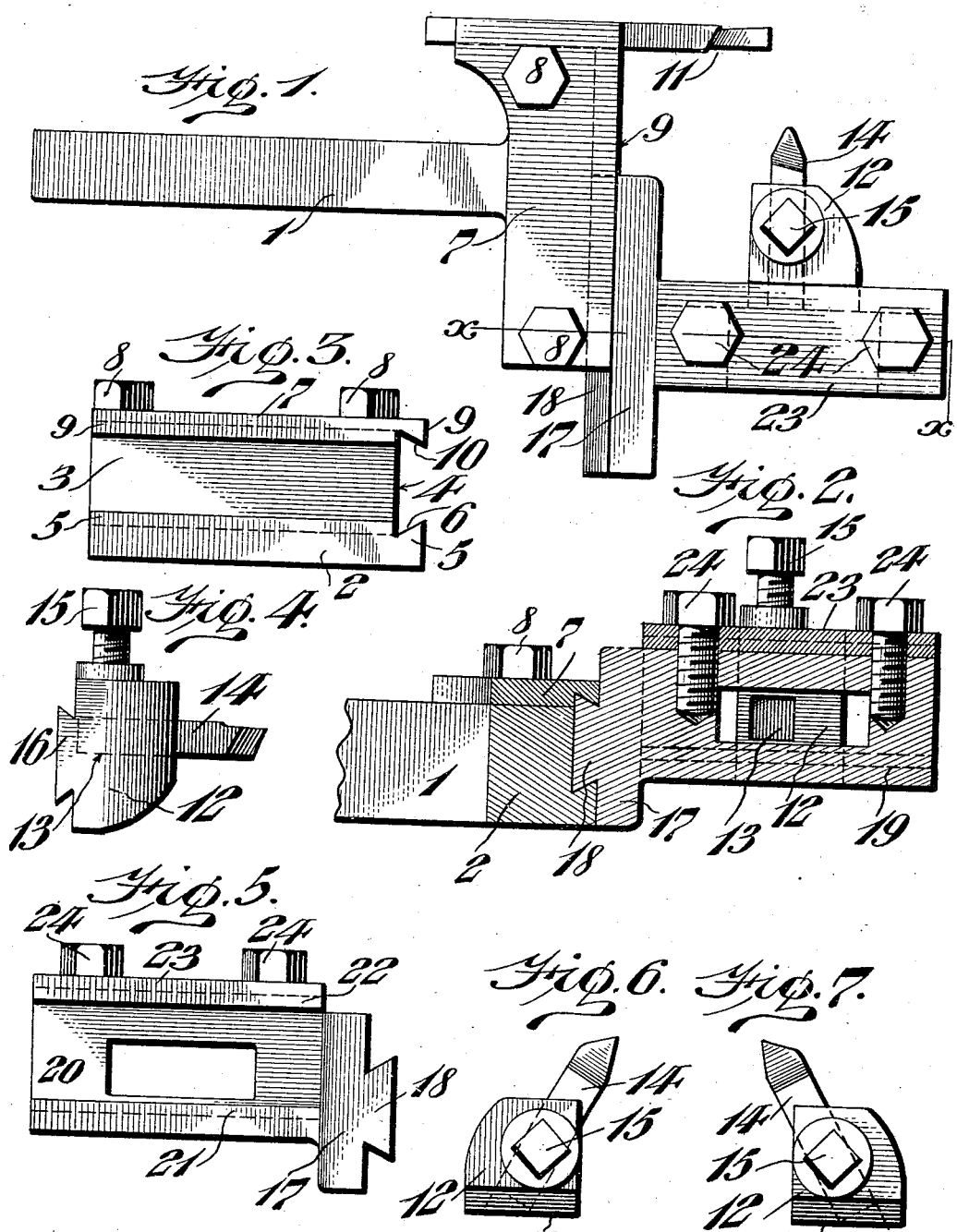

RICHARD B. LEVETT, OF PHILADELPHIA, PENNSYLVANIA.

TOOL-HOLDER.

968,776.

Specification of Letters Patent.  Patented Aug. 30, 1910.

Application filed April 15, 1910. Serial No. 555,643.

*To all whom it may concern:*

Be it known that I, RICHARD B. LEVETT, a citizen of the United States, residing in the city and county of Philadelphia, State of Pennsylvania, have invented a new and useful Tool-Holder, of which the following is a specification.

This invention relates to a tool holder and more particularly that type of holder for use in connection with lathes, planers and like machines wherein the holder is designed to be inserted and clamped in the tool post of the machine and is provided with suitable clamping devices for holding the various types of machine tools firmly and accurately and whereby the same may be turned at any angle desired in order to perform the required work.

In holders as heretofore constructed it has been proposed to clamp a single tool in position to effect a cutting operation but such devices have been found in practice to embody a large number of the disadvantageous features existing in the one piece forged tool.

In my present invention, I have devised a holder wherein the cost is reduced to a minimum and the many adjustments and various styled cutters which may be employed render it an exceedingly effective article and a distinct advance in the art to which it pertains.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan of my novel holder and its attachment in assembled position. Fig. 2 represents a section on line x—x Fig. 1. Fig. 3 represents a front elevation of the holder. Fig. 4 represents a side elevation of one of the auxiliary holders. Fig. 5 represents a side elevation of an attachment for use in connection with the holder shown in Fig. 1. Figs. 6 and 7 represent respectively right and left hand auxiliary tool holders.

Similar numerals of reference indicate corresponding parts in the figures.

Referring to the drawings, 1 designates the shank of my novel tool holder the same being of sufficient length to coöperate with the ordinary tool post of a lathe, planer or the like and by means of which the holder is clamped in position to receive the cutting tool.

In the present instance, the shank 1 has formed integral therewith a head 2 having faces 3 and 4 thereon each of which is provided with an extension 5 formed with a beveled face 6 for a purpose presently to be described.

7 designates a plate, in the present instance, detachably and adjustably secured to the head 2 by means of stud bolts 8 or like fastening devices the said plate having extensions 9 formed thereon each of which is provided with a beveled face 10 and it will be noted that the beveled faces 6 and 10 are juxtaposed, in order to form with the faces 3 and 4, dove-tailed slots with either of which a suitable member or members may coöperate. It will now be apparent that if a suitable shaped tool or a suitable clamp member is placed within either of the dove-tailed grooves just described and the plate 7 securely bolted down, the same will be held firmly for cutting or like purposes.

In Fig. 1, I have shown a parting tool 11 secured in position in one of the dove-tailed grooves and it will be readily seen how easily the tool may be adjusted and positioned relative to the work.

In order to provide for adjustment of the various tools, I preferably employ an auxiliary tool holder 12 having an opening 13 therein to receive a tool 14 such as a diamond point, side tool or the like, the latter being held in position by means of a suitable stud 15 threading into the member 12 and engaging the tool 14, as will be apparent.

16 designates a beveled tongue preferably formed integral with the member 12 and projecting on one side thereof in order to engage either one of the grooves formed in the head 2 it of course being understood that this tongue is substantially of the same dimension as the said groove.

Attention is directed to Figs. 6 and 7 wherein two of these auxiliary tool holders are shown, one a right hand member and the other a left, the purpose of which will be perfectly obvious and either one may be attached to the head 2 as desired or if required both may be in use at the same time. It will thus be apparent that the head 2 also forms a holder wherein an auxiliary tool holder for a suitable tool may be held, at the same time permitting the position of the same to be changed as desired and adjusted for various kinds of work.

Referring to Figs. 1, 2 and 5, 17 designates the body portion of an attachment for use in connection with the tool holder and having integral therewith a beveled tongue 18 for coöperation with either one of the grooves of the head 2 and by means of which the body portion 17 is secured to the holder and may be shifted from one portion of the holder to another and adjusted according to circumstances. This body portion 17 has formed integral therewith an extension 19 one face 20 of which is provided with a beveled flange 21 opposite to which is a similar flange 22 formed upon a plate 23 which latter is adjustably secured to the extension 19 by means of studs 24 or like fastening devices.

It will thus be clear that the auxiliary tool holder 12 may be positioned in the groove formed by the flanges 21 and 22 and held in place in any desired position by the clamping action of the plate 23 thereby bringing the tool into proper working relation with the stock.

Another very important feature of my novel holder resides in its use as a combination tool holder in that two tools may be used at the same time and in Fig. 1 I have shown a device so assembled, a parting tool 11 being mounted in the head proper while the facing tool 14 is secured to the auxiliary tool holder and positioned to operate at the same time that the parting tool is cutting off a portion of the stock, as in cases of facing and parting piston rings.

It will now be apparent that I have devised a complete unitary structure, simple in construction, efficient in operation and capable of various arrangements for the purpose intended.

Having thus described my invention, what I claim as new and desire to secure by Letters Patent, is:—

1. In a device of the character described, a shank, a head thereon, a beveled extension on said head, a plate adjustably secured to said head and a flange on said plate oppositely disposed to said extension whereby a tool or tool holder may be held securely.

2. In a device of the character described, a shank, a head thereon having a groove formed in two sides thereof, means to secure a cutting tool in either of said grooves, and an attachment device secured by said means and adapted to carry an auxiliary tool holder.

3. In a device of the character described, a shank, a head thereon, an attachment device, means to adjustably secure an auxiliary tool holder to said attachment device and means to secure said attachment device to said head.

4. In a device of the character described, a shank, a head thereon, an attachment device having a groove therein, an auxiliary tool holder having a tongue coöperating with said groove, a plate adjustably secured to said attachment device and having means engaging said tongue, and means to secure said attachment device to said head.

5. In a device of the character described, a shank, a head thereon, means to secure a tool to said head, an attachment device having a groove therein, an auxiliary tool holder having a tongue coöperating with said groove, a plate adjustably secured to said attachment device and having means engaging said tongue and means to secure said attachment device to said head.

RICHARD B. LEVETT.

Witnesses:
JOHN A. WIEDERSHEIM,
N. BUSSINGER.